(12) United States Patent
Gearhart et al.

(10) Patent No.: US 9,651,392 B2
(45) Date of Patent: May 16, 2017

(54) METHODS AND SYSTEMS FOR PROVIDING DYNAMIC POINT OF INTEREST INFORMATION AND TRIP PLANNING

(71) Applicant: MapQuest, Inc., Denver, CO (US)

(72) Inventors: G. Duane Gearhart, Hummelstown, PA (US); Adam H. Risser, Lititz, PA (US); Beth A. Warner, York, PA (US); Marshall B. Matthews, Mountville, PA (US); Lindsey Young, Wrightsville, PA (US); Elizabeth McIlhany, Denver, CO (US); Michael Ringrose, Hanover, PA (US)

(73) Assignee: MapQuest, Inc., Denver, CO (US)

( * ) Notice: Subject to any disclaimer, the term of this patent is extended or adjusted under 35 U.S.C. 154(b) by 0 days.

(21) Appl. No.: 14/160,992

(22) Filed: Jan. 22, 2014

(65) Prior Publication Data

US 2015/0204685 A1    Jul. 23, 2015

(51) Int. Cl.
*G01C 21/36* (2006.01)
*G01C 21/34* (2006.01)
*G06F 3/0484* (2013.01)

(52) U.S. Cl.
CPC .......... *G01C 21/36* (2013.01); *G01C 21/343* (2013.01); *G01C 21/367* (2013.01); *G01C 21/3614* (2013.01); *G01C 21/3664* (2013.01); *G01C 21/3682* (2013.01); *G06F 3/04847* (2013.01)

(58) Field of Classification Search
None
See application file for complete search history.

(56) References Cited

U.S. PATENT DOCUMENTS

| 5,802,492 | A  | * | 9/1998 | DeLorme et al. | 455/456.5 |
| 6,401,034 | B1 | * | 6/2002 | Kaplan et al. | 701/416 |
| 7,271,742 | B2 | * | 9/2007 | Sheha et al. | 340/995.24 |
| 7,369,127 | B1 | * | 5/2008 | Hull | 345/440 |
| 7,729,947 | B1 | * | 6/2010 | Philbin et al. | 705/26.9 |

(Continued)

FOREIGN PATENT DOCUMENTS

EP    2072953    6/2009

OTHER PUBLICATIONS

Extended European Search Report dated May 21, 2015, issued in corresponding European Application No. 15152189.5, (8 pages).

*Primary Examiner* — Yonel Beaulieu
*Assistant Examiner* — Krishnan Ramesh
(74) *Attorney, Agent, or Firm* — Bookoff McAndrews, PLLC

(57) ABSTRACT

Computer implemented methods are disclosed for providing to a user geographical mapping information relating to a trip from a start location to a destination location. One method includes receiving user input data including at least the destination location; receiving a location of a point movable by the user along the route from the start location to the destination location on an electronic map; displaying one or more points of interest within a range of the location of the point; receiving a selection by the user of at least one of the one or more points of interest; generating a modified route from the start location to the destination location which includes the selected at least one of the one or more points interest; and displaying the modified route with the selected at least one of the one or more points interest.

21 Claims, 6 Drawing Sheets

(56) References Cited

U.S. PATENT DOCUMENTS

| | | | | |
|---|---|---|---|---|
| 8,022,831 B1* | 9/2011 | Wood-Eyre | | B60T 7/14 |
| | | | | 180/272 |
| 8,090,533 B2* | 1/2012 | Koike et al. | | 701/410 |
| 8,095,303 B1* | 1/2012 | Nesbitt et al. | | 701/426 |
| 8,467,960 B2* | 6/2013 | Rinscheid | | 701/416 |
| 8,611,930 B2* | 12/2013 | Louboutin et al. | | 455/456.3 |
| 8,762,053 B1* | 6/2014 | Lehman | | 701/438 |
| 2004/0054428 A1* | 3/2004 | Sheha et al. | | 700/56 |
| 2004/0236504 A1* | 11/2004 | Bickford et al. | | 701/207 |
| 2004/0260465 A1* | 12/2004 | Tu | | 701/209 |
| 2005/0261822 A1* | 11/2005 | Wako | | 701/200 |
| 2006/0089788 A1* | 4/2006 | Laverty | | G01C 21/3679 |
| | | | | 701/426 |
| 2007/0219706 A1 | 9/2007 | Sheynblat | | |
| 2008/0097698 A1* | 4/2008 | Arnold-Huyser | | G08G 1/0969 |
| | | | | 701/300 |
| 2009/0005973 A1* | 1/2009 | Salo et al. | | 701/209 |
| 2009/0037101 A1* | 2/2009 | Koike et al. | | 701/209 |
| 2009/0234577 A1* | 9/2009 | Rinscheid | | 701/201 |
| 2010/0088018 A1 | 4/2010 | Tsurutome et al. | | |
| 2010/0174480 A1* | 7/2010 | Trenkle et al. | | 701/201 |
| 2010/0305842 A1* | 12/2010 | Feng | | G06F 17/3087 |
| | | | | 701/533 |
| 2011/0059759 A1* | 3/2011 | Ban | | 455/466 |
| 2011/0153186 A1* | 6/2011 | Jakobson | | 701/200 |
| 2012/0041673 A1 | 2/2012 | Vandivier | | |
| 2012/0116673 A1* | 5/2012 | Lee et al. | | 701/432 |
| 2012/0197696 A1* | 8/2012 | Beyeler et al. | | 705/14.4 |
| 2013/0218463 A1* | 8/2013 | Howard et al. | | 701/533 |
| 2013/0253832 A1* | 9/2013 | Nallu et al. | | 701/537 |
| 2013/0303192 A1* | 11/2013 | Louboutin et al. | | 455/456.3 |
| 2013/0304372 A1* | 11/2013 | Mellert | | 701/410 |
| 2014/0274107 A1* | 9/2014 | Rados | | 455/456.1 |
| 2014/0303889 A1* | 10/2014 | Richter | | G01C 21/3682 |
| | | | | 701/426 |
| 2015/0066356 A1* | 3/2015 | Kirsch et al. | | 701/425 |

* cited by examiner

METHODS AND SYSTEMS FOR PROVIDING DYNAMIC POINT OF INTEREST INFORMATION AND TRIP PLANNING

TECHNICAL FIELD

Various embodiments of the present disclosure relate generally to providing geographical mapping information. More specifically, exemplary embodiments of the present disclosure relate to systems and methods for providing dynamic point of interest information, and user-customizable route planning.

BACKGROUND

In recent years, the use of electronic or digital maps and mapping applications has grown significantly. Such mapping applications may be executable by various types of user electronic devices. Examples of such devices include, but are not limited to, a computer connected to the Internet, an onboard navigation system in a vehicle, a dedicated portable Global Positioning System (GPS) device, a mobile computer device (e.g. a smartphone), or other type of GPS-enabled computing device. The displayed electronic maps often convey information related to roads, traffic, buildings, landmarks, terrain, and other geographic locations or regions of interest. Most electronic maps allow users to view various portions of a map (e.g. scrolling around, zooming in and out, etc.)

Some electronic maps may be interactive, receiving user inputs such as an input of a specific geographic location, to view a map of that location and the surrounding locations. Some mapping applications may also include route guidance features allowing users to receive route information or driving directions to a particular address based on each user's input of a location or detection of each user's current geographic location, as derived through GPS or other location detecting means.

Interactive maps may also provide information about various points of interest (POIs) at or near a location selected or specified by a user. A POI may be, for example, a specific business, destination, or attraction that is useful or interesting to an individual or a group of individuals, or that the individual or the group may want to visit. By way of example, POIs on a map display may represent gas stations, rest areas, hotels, restaurants, museums, hospitals, historical sites in a specific geographic area, houses for sale, etc. A POI may also correspond to a movie theater showing a particular film, a restaurant that serves a specific type of food, such as pizza, etc.

Electronic maps, either interactive or non-interactive, may be used for planning or taking a trip. Such trips may be to the same location (e.g., daily commuting from home to work), new short-distance trips to unfamiliar locations, long-distance vacation road-trips, or any other type of travel. For example, a user may use an electronic mapping application executable at the user's device to input origin and destination locations and obtain routing directions to and from the locations. Mapping service providers also may track a user's location using GPS or other location detecting means coupled to a user's electronic device. Based on this location information, the electronic maps may provide users with real-time information, such as live traffic information. The electronic maps also may provide dynamic routing adjustments for a predetermined or prescribed route of travel when the location of the user's device is tracked.

However, conventional mapping applications or services do not provide advance identification and interactive user consideration and selection of POIs at various points along a planned route at which to take a travel break. This may cause users to take travel breaks at less than preferred locations.

SUMMARY OF THE DISCLOSURE

Accordingly, a need exists for methods, systems, and devices that provide dynamic user interaction with a route to obtain optimized travel information, such as points of interest and POI information. In addition, a need exists for methods, systems, and devices that provide dynamic user interaction with POI information for the purpose of revising a mapping route to include POIs as intermediate stops from an origin to a destination, as desired by a user.

According to certain embodiments, computer-implemented methods are disclosed for providing to a user geographical mapping information relating to a trip from a start location to a destination location, the method including: receiving, from a user's electronic device and over a network, user input data including at least the destination location; generating and displaying a route from the start location to the destination location on an electronic map based on the user input data, the route having a point movable by the user along the route; receiving, from the user's electronic device, a location of the point movable by the user along the route; determining and displaying on the electronic map, one or more points of interest within a range of the location of the point; receiving, from the user's electronic device, a selection by the user of at least one of the one or more points of interest; generating a modified route from the start location to the destination location which includes the selected at least one of the one or more points interest; and displaying, on the user's electronic device, the modified route with the selected at least one of the one or more points interest.

Aspects of the disclosure relate to one or more of: receiving, from the user's electronic device, a selection of a travel range from the route, wherein the step of determining points of interest is determined within the selected travel range from the route. In some aspects, the travel range is distance, and/or the travel range is time. In some aspects, the steps between generating a route and generating a modified route are repeated each time the point is moved along the route by the user. In some aspects, the step of receiving, from a user's electronic device and over a network, user input data includes at least the destination location, and further comprises receiving at one additional parameter. In some aspects, the at least one additional parameter comprises a type of points of interest, and/or the start location is determined based on the location of the user's electronic device. In some aspects, the step of determining and displaying one or more points of interest comprises accessing mapping data related to the route from at least one database. In some aspects, the movable point is displayed as a selector, and/or the selector is movable on locations not on the route. In some aspects, the step of determining and displaying the one or more points of interest within the range of the selected point along the route on the electronic map is dynamically coupled to movement of the movable selector along the route. In some aspect, the method may include comprising completing an electronic transaction with an entity associated with at least one of the selected one or more points of interest. In some aspects, the movable point comprises a plurality of movable points. In some aspects, the step of determining and displaying one or more points of interest within a distance range of the movable point along the route on the electronic map comprises determining and displaying route information relative to the start location.

According to another embodiment, systems are provided for providing to a user geographical mapping information relating to a trip from a start location to a destination. Certain systems may include: a data storage device storing instructions for causing computer servers or mobile devices to provide to a user geographical mapping information relating to a trip from a start location to a destination, and a processing device configured to execute the instructions to perform a method of: receiving, from a user's electronic device and over a network, user input data including at least the destination location; generating and displaying a route from the start location to the destination location on an electronic map based on the user input data, the route having a point movable by the user along the route; receiving, from the user's electronic device, a location of the point movable by the user along the route; determining and displaying on the electronic map, one or more points of interest within a range of the location of the point; receiving, from the user's electronic device, a selection by the user of at least one of the one or more points of interest; generating a modified route from the start location to the destination location which includes the selected at least one of the one or more points interest; and displaying, on the user's electronic device, the modified route with the selected at least one of the one or more points interest.

According to certain embodiments, a computer-readable medium is disclosed storing instructions that, when executed by a processor, cause the processor to provide a method including: receiving, from a user's electronic device and over a network, user input data including at least the destination location; generating and displaying a route from the start location to the destination location on an electronic map based on the user input data, the route having a point movable by the user along the route; receiving, from the user's electronic device, a location of the point movable by the user along the route; determining and displaying on the electronic map, one or more points of interest within a range of the location of the point; receiving, from the user's electronic device, a selection by the user of at least one of the one or more points of interest; generating a modified route from the start location to the destination location which includes the selected at least one of the one or more points interest; and displaying, on the user's electronic device, the modified route with the selected at least one of the one or more points interest.

The disclosed embodiments achieve convenient trip planning by dynamically determining and displaying points of interest along a route in response to user input and presenting a customized route based on the user input.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for determining and electronically presenting routing information on a user's electronic device. In particular, the present disclosure describes methods and systems for automatically generating a route based on a user's start and destination locations, dynamically presenting information regarding the route in response to the user's interaction with the route, and generating a customized route based on the user's selection of locations along the route. For purposes of illustration, if a user electronically inputs start and destination locations, then the user will be electronically presented with a route and directions from the start location to the destination location.

The present disclosure also describes methods and systems for dynamically presenting POI information corresponding to the route, for enabling the user to add one or more POIs to the route as one or more intermediate trip break points. For example, systems and methods may implement a movable selector or a cursor that the user can move along the route to dynamically display various route information, including POIs close to the location of the movable selector. The user may select a point of interest to receive further information about it, and may complete a transaction with the point of interest directly from the route e.g. as a travel break point. The user may select one or more of the POIs dynamically displayed in response to the user's movement of the movable selector along the route for addition to the route. The user may then be presented with a modified route and directions from the start location to the destination location, where the planned route includes the user selected POIs as intermediate stops. In this manner, the user may efficiently plan a customized trip based on the user's POI selections, and information discerned from interrogating various points along the mapped route for desired POI information.

Figure 1:
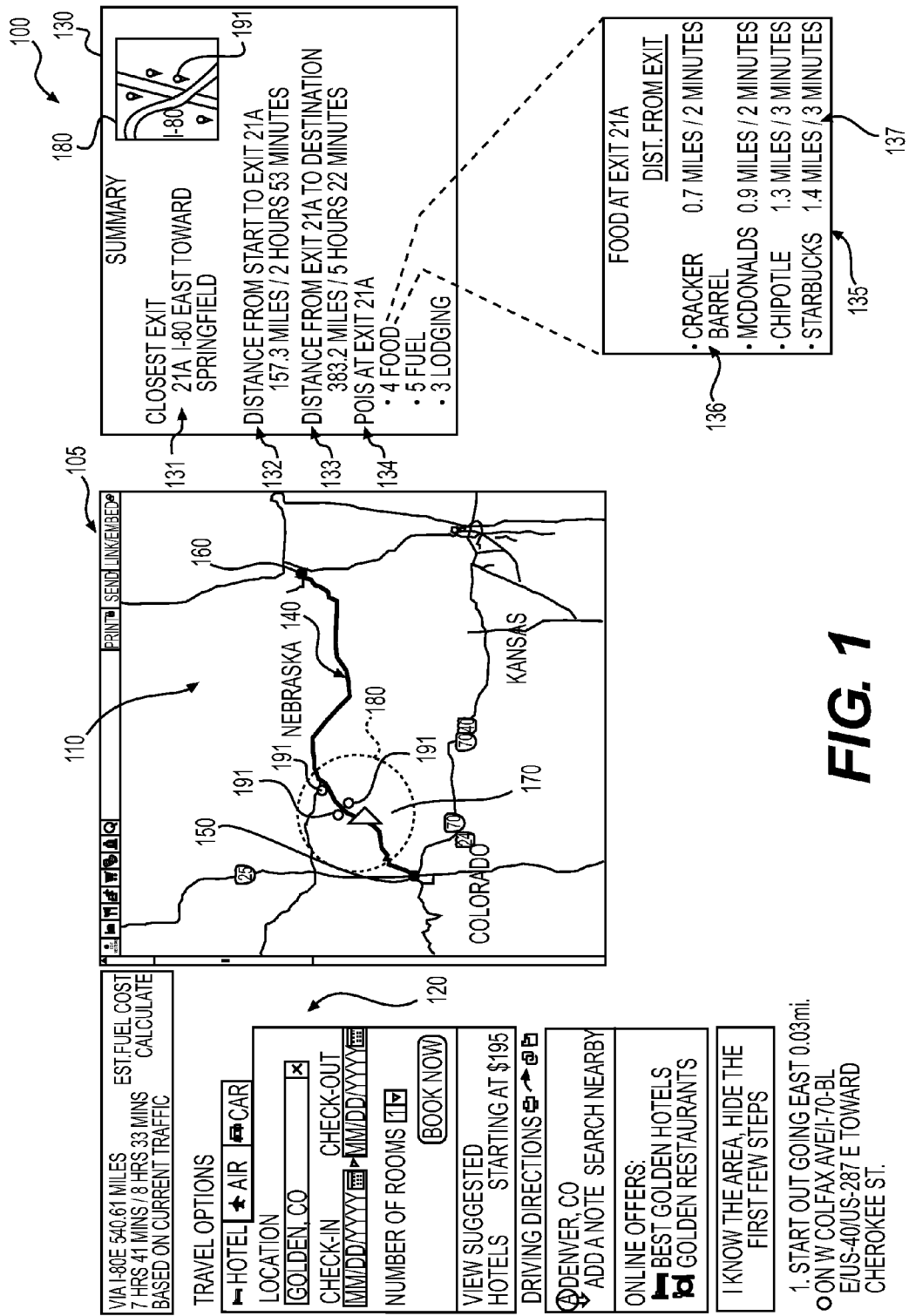
FIG. 1 is a diagram illustrating dynamic user selectable points of interests along an electronic presentation of a mapping route.
Figure 2:
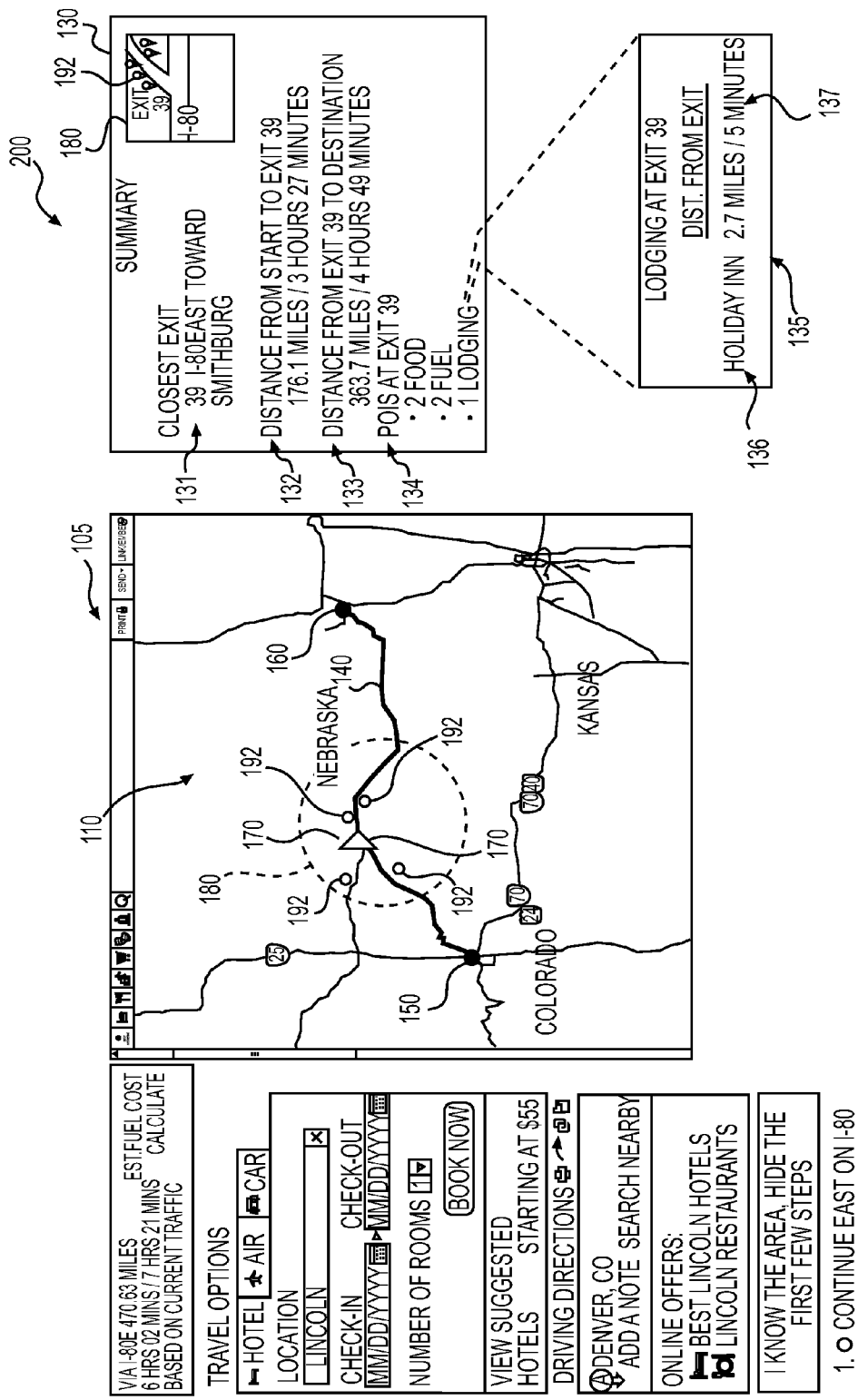
FIG. 2 is a diagram illustrating dynamic user selectable points of interests along an electronic presentation of a mapping route.
Figure 3:
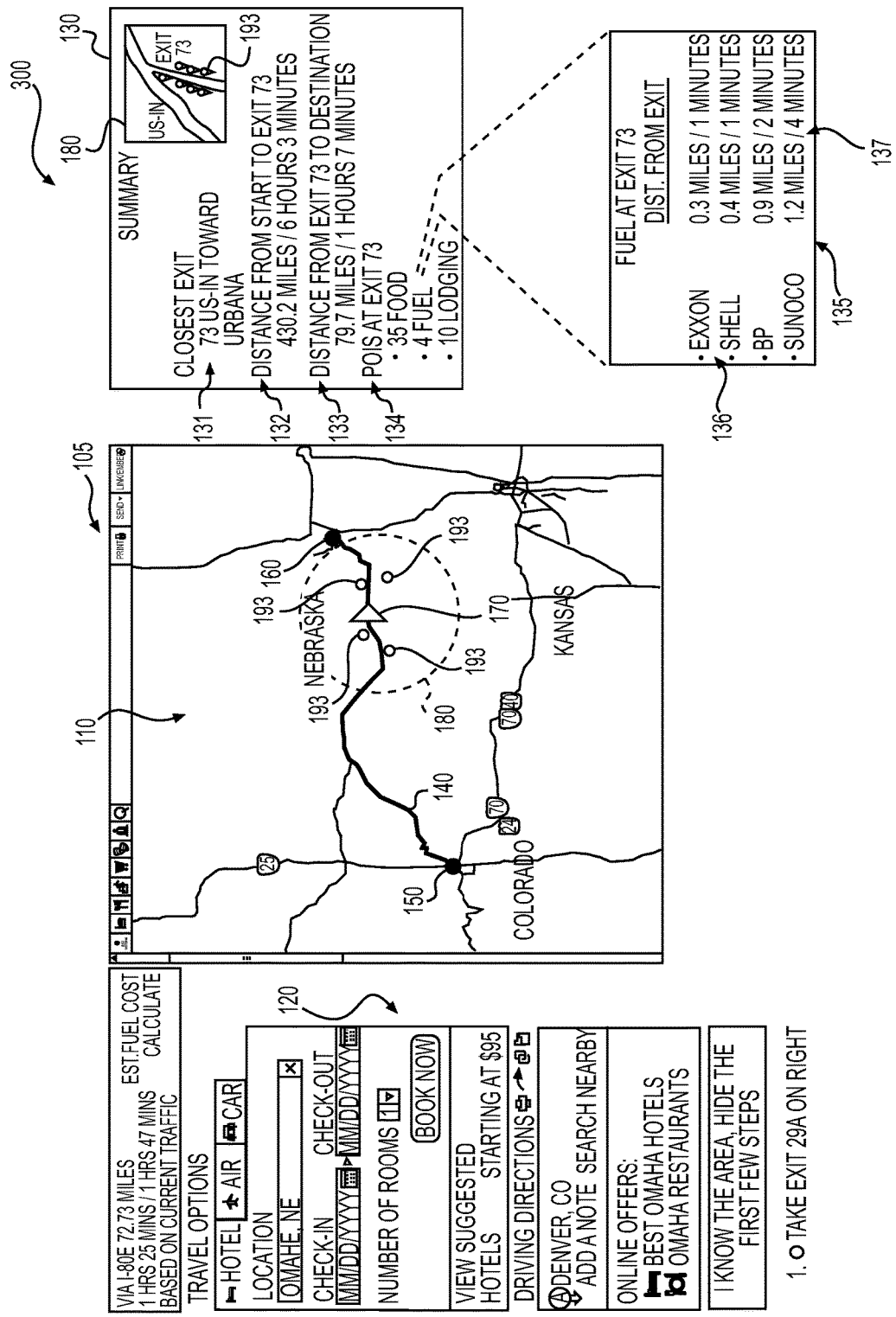
FIG. 3 is a diagram illustrating dynamic user selectable points of interests along an electronic presentation of a mapping route.

Referring now to the figures, FIGS. 1-3 are illustrations 100, 200, and 300 of an electronic mapping site 105 showing an electronic map 110 with a route 140, an input portion 120, and an information display portion 130. Each of the electronic map 110, input portion 120, and information display portion 130 may be positioned in any suitable manner on the electronic mapping site 105 and may be enlarged, reduced, or minimized by the user.

The input portion 120 may include one or more fields for a user to enter information. For example, a user may input start and destination locations, and/or filters for displaying POIs on the mapped route. The electronic map 110 may include a movable selector 170 movable by the user along one or more routes 140. The movable selector 170 may be any user element, such as a cursor, shaded area, slider, window, etc. that the user can manipulate to selectively define geographic area around a portion of a route. In response to the location and/or movement of the movable selector 170, the electronic map 110 may dynamically display various POIs 191 within or in close proximity to the movable selector 170. Simultaneously, the information display portion 130 may dynamically update and display information about the route and the POIs 191 in response to the movement of the selector 170 along the route 110. The electronic map 110 also may include an adjustable zone 180 around the movable selector 170 within which the POIs 191 may be shown. As shown in FIGS. 1-3, the user may move the movable selector 170 along the route 140 from the start location 150 to the destination location 160 and vice versa, to dynamically display various POIs 191, 192, and 193 respectively, on the electronic map 110 and the information display portion 130.

The electronic map 110 may be of any suitable form and/or type of view, such as a map view, satellite view, live traffic view etc. The electronic map 110 may be any suitable size to be displayed by an electronic device and its view may be manipulated, (e.g. zoomed in and out, rotated, etc.). The electronic map 110 may be of any scale, e.g. transcontinental, continental, region, state, city, neighborhood, campus, etc. The electronic map 110 also may include various identifiers, e.g. geographic markers landmarks, road names, etc.

In some embodiments, the electronic mapping site 105 may be an electronic map on a mobile navigation application. In such embodiments, the movable selector 170 may be automatically updated or moved based on detecting, via GPS or in any other suitable manner, the current location of the mobile electronic device.

The input portion 120 may include any suitable input fields, such as start, and destination locations, POI parameters (e.g. distance range from route, types of POIs, etc.,) display options (e.g. type of map, type of measurements, etc.), travel dates and times, etc. Once information is inputted by the user in the input portion 120, the information display portion 130 may display route information, such as directions, travel times and distances, etc.

The information display portion 130 may include any suitable information regarding the route and/or points along the route in response to movement of the movable selector 170 along the route 140. In some embodiments, if the movable selector 170 is close to or at a highway exit, the information display portion 130 may include information associated with the closest exit, such as the exit number, exit branch information, exit toward information (e.g. locations (cities) or roads a user may be heading toward at specific exit, etc.) The information display portion 130 also may include a summary count of the number of various different categories or types of POIs 191, such as food, lodging, fuel, etc. Each of the display information in the information display portion 130 may be selectable by the user to receive detailed POI information, for example in another display 135. The detailed POI information display 135 may display user requested additional information that is sorted and displayed in any suitable manner, for example, by travel time or distance, based user preferences, etc.

For example, the information display portion 130 may dynamically display a summary of relevant route and POI information relative to the movable selector. As shown in FIGS. 1-3, the information display portion may display closest exit information 131, distance from the start location to the closest exit 132, and distance from the closest exit to the destination location 133. The information display portion 130 also may include a summary of POIs at the closest exit 134. The summary 134 may be displayed in any suitable manner, for example, listing the number of each POI in various POI categories (e.g. Food, Fuel, Lodging, etc.). The information display portion also may include a magnified or zoomed in view 190 of the electronic map 110 showing the closest exit and the POIs (191, 192, 193) near the exit.

The information displayed on the information display portion 130 may be selected by the user in any suitable manner to access detailed information. For example, a user may select a one or more POI categories 134 and may be presented, in any suitable manner, with detailed information of the POIs at the exit. For example, as shown in FIGS. 1-3, selection of a POI category 134 may open up a new detailed POI information display 135, such as a window, pop-up screen, information panel, or any other type of display 135 displaying detailed information about the POIs. For example, the detailed POI information display 135 may include the particular POI 136 and also may display distance information 137 (distance and/or travel time) from the closest exit to the POI.

The information display portion 130 may also display information related to the route 140. The input portion 120 or information display portion 130 may then allow a user to conduct an online transaction with the POI. For example, the information display portion 130 may display hotels having room vacancies for the dates of travel indicated by the user and allow the user to reserve a hotel room via the input portion 120. The information display portion also may display the number of POIs within a distance range of the location of the movable selector 170. For example, the information display portion 130 may display the number of POIs in particular POI categories within a distance range, etc., such as three gas stations, one coffee shop, four restaurants, two pharmacies, etc. within 1.5 miles of the location of the movable selector 170.

Each route 140 may be any route between at least two locations, such as the start location 150 and destination location 160. The route 140 may be navigable by any mode of transport, such as by foot, human powered vehicle, electric or fuel powered vehicle, e.g., via road, water, air, or any other suitable means. For example, the route(s) may be between a commuter's home and workplace, between a user's home and a vacation or tourist destination, or any other start or destination location. Each route 140 may be a best (shortest travel distance or fastest travel time) route, recommended route, or a user-preferred route, as inputted in the input portion 120. In other examples, multiple optional or alternative routes 140 may be displayed based on various calculations. In addition, while the electronic map 110 may display one start location 150 and one destination location 160, the electronic map may alternatively display multiple start locations 150 and multiple destination locations 160. Each of the one or more routes 140 may include various markers and may be displayed in a distinguishing manner relative to each other and other roads either by different colors, different patterns, different shades, via differing animations (e.g., flashing, moving feature, or any other animation), or any other graphically distinguishing manner.

The start 150 and destination 160 locations may be any locations identifiable on a map, such as having a street address or identifiable latitude and longitude coordinates. For example, either or both of start location 150 and destination location 160 may be a street address, intersection, landmark, transit location, location within a building, location within a park, location within a body of water, location in the air, or any other identifiable location.

The movable selector 170 may be any suitable icon movable by the user along the route. For example, the movable selector 170 may be a cursor, button, shaded area, window, slider, etc. The movable selector 170 may also be moved from the route to any location on the electronic map 110.

In one embodiment, the movable selector 170 may be moved by the user to any location along the route 140. In another embodiment, the movable selector 170 may be configured to the nearest pre-determined geographic location, such a highway exit. For example, in one embodiment, the information display portion 130 may display all of the POIs and the number of POIs in each POI category that are associated with the one or more highway exits selected by the user, such as by using the movable selector 170, the adjustable zone 180, and/or any other user input tool. For example,the user may have selected an icon on electronic map 110 (e.g., an icon of an exit sign, an exit number, or an intersecting road number) to select a highway exit for which POIs will be shown in information display portion 130. In one embodiment, the POIs may be associated the selected exit and therefore shown on the information display portion 130 according to any desired criteria, such as drive time or drive distance to the exit on ramp, off ramp, and/or intersection, or any other predetermined matching or assigning of POIs to one or more highway exits.

In one embodiment, multiple movable selectors 170 may be added by the user and moved along the route 140 in any direction and/or any portion of the map. For example, one movable selector 170 may be moved in one direction along the route 140 and another movable selector 170 may be moved along the route 140 in the opposite direction. Each of the movable selectors 170 may have the same or different size, shape, and/or color.

The movable selector 170 may be surrounded by an adjustable zone 180. The adjustable zone 180 may have any suitable size, either based on a predetermined distance parameter or based on a travel value inputted by the user and may move with the movable selector 170 along the route 140. The travel value may be any suitable measure of travel, such as distance, travel time, etc. Various POIs 191 within the adjustable zone 180 may be displayed on the electronic map in any suitable manner, such as using representative icons. Each icon representing different types of POIs 191 may be the same or have different shapes, colors, sizes, etc.

FIGS. 2 and 3 show views of the electronic map updated based on movement of the movable selector 170 along the route 140. As shown in FIGS. 2 and 3, in response to movement of the movable selector 170 to a different location, the electronic map 110 determines and displays POIs 191 close to the location of the movable selector and updates the input portion 120 and information display portion 130 based on the movement of the movable selector 170 to a different geographic location. than in FIG. 1. For example, in response to the movement of the movable selector 170 to a new location, the input portion 120 and information display portion 130 of FIG. 2 may update to display content associated with the new location, e.g. information regarding hotels close to the new location of the movable selector 170 and POIs 192 within a pre-set or user inputted distance range. The distance range may be displayed as the adjustable zone 180. The adjustable zone 180 may be manipulated by the user to change its size, shape, and other properties. Similarly, in response to the movement of the movable selector 170 to another location, the input portion 120 and information display portion 130 of FIG. 3 may update to display content associated with the new location, e.g. information regarding hotels close to the new location of the movable selector 170. New POIs 193 within a distance range the location of the movable selector 170 as shown in FIG. 3 may be displayed and the input portion 120 and the information display portion may be dynamically updated with information associated with the present location of the movable selector 170.

Each POI 191 may be selected by the user, for example by clicking the point of interest icon, which may change the appearance of the point of interest icon, for example, changing the color, size, etc. For example, in one embodiment, when a user interacts with an icon or other user element within information display portion 130, a corresponding POI or category of POIs may be highlighted or otherwise indicated on the electronic map 110. Alternatively or additionally, when a user interacts with an icon or other user element of a POI 191 indicated in electronic map 110, a corresponding icon or other POI information shown in information display portion 130 may be highlighted or otherwise indicated.

Figure 4:
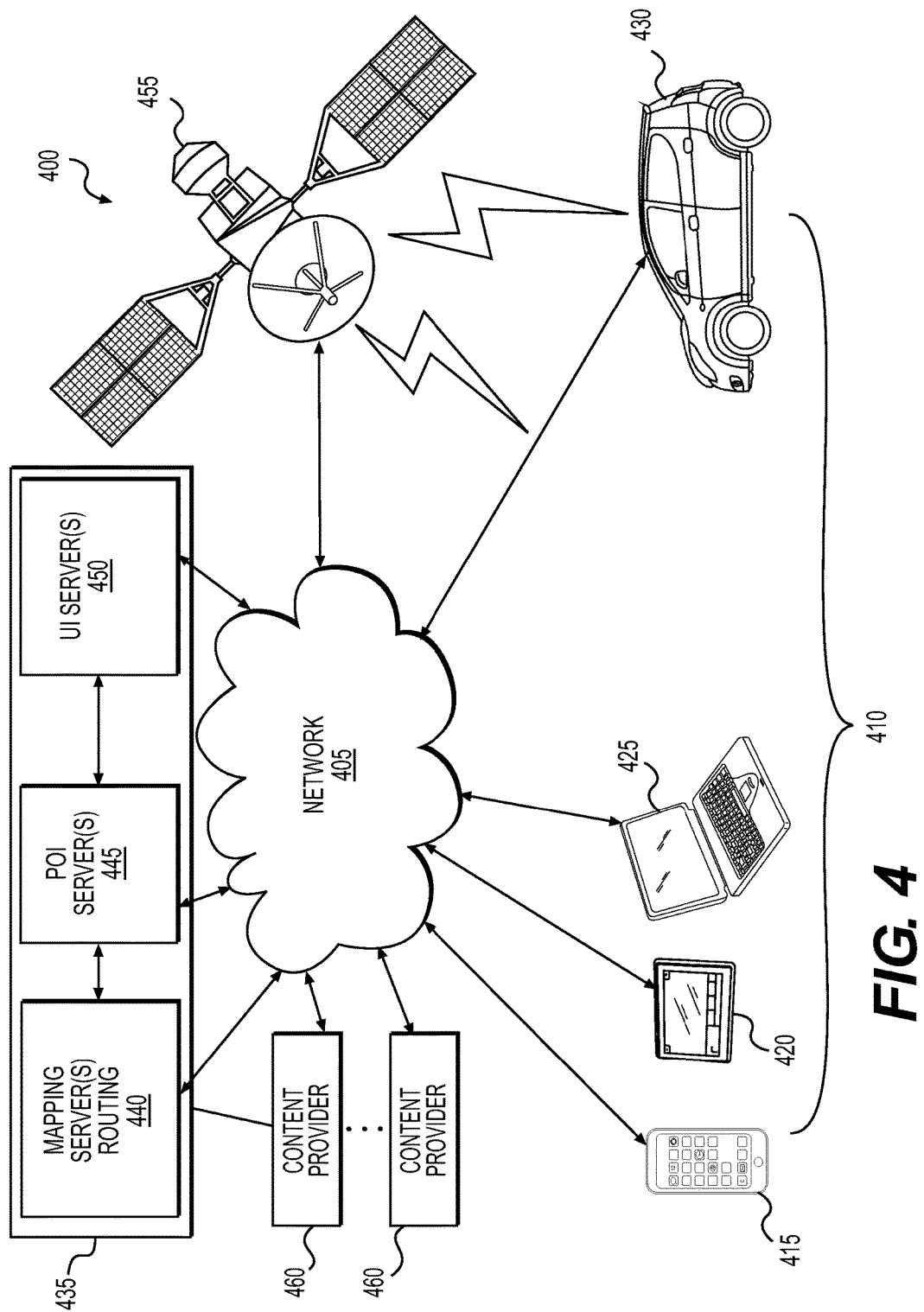
FIG. 4 is a block diagram of a communications system configured to present users with automatically generated dynamic routes between a start location and a destination location and points of interest information, according to an exemplary embodiment of the present disclosure.

FIG. 4 is a block diagram of a communications system 400 capable of presenting routes and route information for a trip, between at least two points. For example, along a route between start 150 and destination locations 160 via a network 405, such as the Internet, to one or more electronic devices 410, such as a mobile device 415 (e.g., mobile phone, personal digital assistant, tablet computer), a GPS device 420, a computer (laptop, desktop, tablet) 425, in-vehicle navigation system 430, and/or any device connected to a network 405, such as the Internet, according to an exemplary embodiment of the present disclosure.

The electronic device 410 may receive information via the network 405 from a system of servers 435, having one or more servers such as mapping/routing 440, POIs 445, user interface servers 450, and/or any other suitable servers. Each server may include memory, a processor, and/or a database. For example, the mapping server 440 may have a processor configured to retrieve mapping information and generate routing information, POI server 445 may have database of POIs and a processor configured to retrieve POI information and provide POI information, and user interface server 450 may be configured to receive and process user input. The system 400 also may include a satellite 455 configured to send and receive location and other information to the server system 435 and electronic devices 410.

The various electronic devices 410 may communicate with each other by any suitable means (e.g., via the network 405, Bluetooth, Near Field Communication, or any other suitable means) to send and receive location and other information. For example, a mobile device 415 may communicate with a GPS device 420, 430 in communication with the satellite 455.

The mapping server 440 may receive information regarding a user's trip, such as a start location, destination location, and any user route preferences directly from the electronic device 410 via the network 405 or indirectly via the user interface server 450. The mapping server 440 may save the information in memory, such as a computer readable memory.

The mapping server 440 also may be in communication with one or more other servers, such as the POI server 445 and/or external servers such as servers of content providers 460. The content providers 460 may include advertisers, news sources, entities affiliated with POIs (e.g. ad agents, marketers). In one embodiment, the content provider 460 may be a hotel chain owner providing advertisement and information regarding room vacancies for hotels along the route. In other embodiments, the content provider may be restaurants providing advertisement information regarding seasonal menu items and location. Other examples may include retail stores, amusement parks, etc. providing advertisements about their locations. In addition, the mapping server 440 may include data from other users, traffic reports, weather reports, police reports, and/or any other source of relevant information and the POI server 445 may include reviews of POIs, details about POIs and/or any other relevant information. The mapping server 440 may process the information for display on the electronic device 110.

Figure 5:
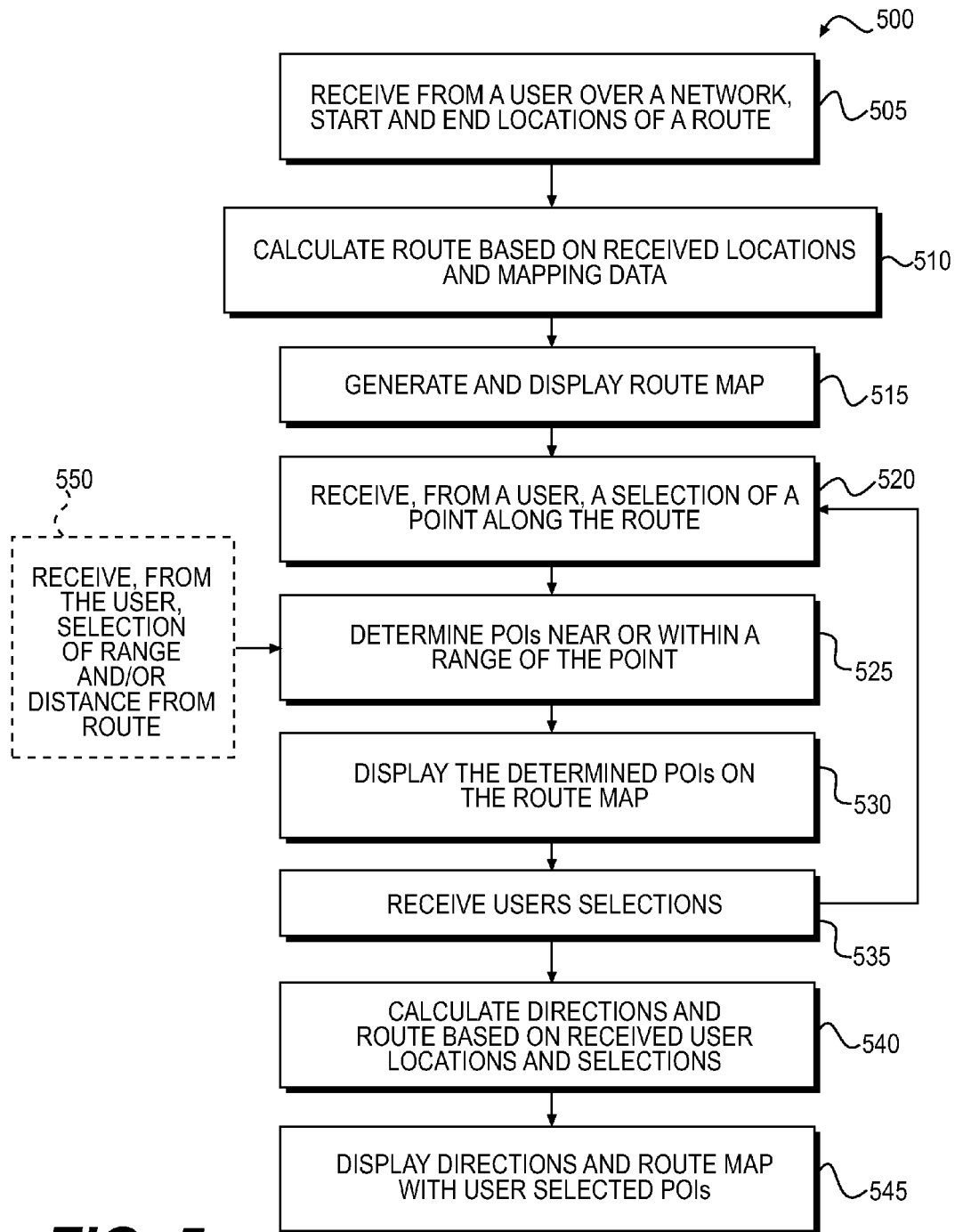
FIG. 5 is a flow diagram of an exemplary method of automatically generating and providing to a user dynamic route and points of interest information for a route between a start location and a destination location, according to an exemplary embodiment of the present disclosure.

FIG. 5 is a flow diagram of an exemplary method of providing dynamic route POI information to a user, according to an exemplary embodiment of the present disclosure. The method 500 may be used for providing a recommended route, and for providing dynamic user selectable POIs along the route. The method 500 may be performed by any component or combination of server(s) 435, and/or electronic devices 410.

In one embodiment, method 500 may include a step 505 of receiving, from a user's electronic device, over a network, start, and destination locations of a route. The start and/or destination locations may be inputted by a user. Alternatively, the start location may be automatically detected based on detecting the location of the electronic device. The user also may input one or more route parameters, such as route preferences (e.g. avoid tollways, shortest distance, fastest route, etc.) The start and destination locations along with any user-inputted parameters may be processed by the mapping/routing server and the route may be calculated at step 510. Based on the route calculated at step 510, a route may be generated and displayed on the electronic device at step 515. The generated route may be displayed on the electronic device along with various map and route display-manipulating tools. For example, the manipulating tools may include a scroll bar or icon for viewing various portions of the map and/or a zoom icon to zoom in and out of the map.

The route map also may include a movable selector, an example of which is shown as 170 in FIG. 1. The movable selector 170 may be an icon having any suitable appearance. The movable selector 170 or cursor may be movable along the route. At step 520, the location of the movable selector 170 along the route may be received and processed. The movable selector 170 may be moved in any manner along the route. For example, the user may continuously move the movable selector 170 along the route, move the movable selector to a particular point on the route and leave the movable selector 170 at that point, or move the movable selector to a particular point on the route and then move the movable selector to another point on the route move and leave the movable selector 170 at that point. In another embodiment, the movable selector 170 may be moved to points not along the route. In another embodiment, the user may add multiple additional movable selectors to the map, along either the route or other portions of the map.

At step 525, in response to the location of the movable selector 170 received, the location may be dynamically processed and POIs near or within a distance range of the location may be determined. Various servers may communicate during this step in order to dynamically obtain the POIs in response to the movement of the movable selector 170. The determination of the POIs also may be based on any POI parameters received from the user. For example, the mapping servers 440, POI server 445 and UI server 450 may communicate with each other to process the location of the movable selector 170 and determine POIs 191, 192, 193 and related information near or with a range of the location of the movable selector 170, such as based on the range displayed in the form of adjustable zone 180. The range also may be based on distance, travel time, or any other measure. The range may be preselected based by the manufacturer of the mapping system. In some embodiments, the range may be displayed on the electronic map 110 as an adjustable zone 180. The adjustable zone 180 may have any shape, size, or orientation. As shown in FIGS. 1-3, the adjustable zone 180 has a circular shape. However, the adjustable zone 180 may have any suitable shape and may be adjusted in any manner. In one embodiment, the adjustable zone may be changed at each location of the movable selector 170.

Alternatively, at step 550, the range may be inputted by the user. For example, the range may be within 2 miles, with a 10-minute drive, or any other range based on the location of the movable selector. The POIs also may be determined based on any additional parameters received, such as a certain type of POI (e.g. restaurants, parks, hotels, etc.).

The POIs determined at step 525 may be displayed on the route at step 530. The POIs may be displayed on the route in any suitable manner, for example as an icon or text. Each displayed POI 191 may be selectable by a user. The POIs may be categorized based on its type and each different category of POI may be displayed on the route map as an icon representing the POI category. In addition, for each POI 191 having a unique associated logo, that logo may be displayed on the route map. The POIs displayed on the route map may be dynamically updated based on the movement of the movable selector 170.

In one embodiment, the determined and/or displayed POIs may be selected based on any additional secondary factors. For example, they may be selected based on the weather, the identity of the origin, the identity of the destination, the time of departure, the estimated time of arrival, numbers/identities/demographics of travelers (e.g., passengers in the car, members of the group), browsing history etc. of the individual planning the trip, advertising profiles of one or more people in the trip, etc.

In one embodiment, when a user selects a POI as a step, stop, or breaking point in the route, the method may perform one or more additional steps. For example, the selected POI may be passed to an advertising system such that the selected POI is added to a profile of the individual or individuals traveling. In other words, the identity of the selected POI, along with any other trip information may be used as inputs to an advertising algorithm executed to determine which advertising and/or content to display to the individual or individuals. For example, if an individual selects a first hotel chain as a POI to be used as a route break point, the identity of the first hotel chain may cause a discount for either the first hotel chain or a second hotel chain to be delivered to the user's mobile device. Likewise, if an individual selects a first restaurant or retailer as a POI to be used as a route break point, the identity of the first restaurant or retailer may cause a discount for either the first restaurant or retailer or a second restaurant or retailer to be delivered to the user's mobile device.

The POIs displayed on the route may be selected by the user in any suitable manner, such as by clicking, highlighting, etc. The POIs selected by the user may be received and processed at step 535. Further information regarding selected POIs may be received and processed. For example, a user may select a POI that is a hotel. Room vacancy and other relevant hotel information may be received and displayed to the user. The user may then book a room and perform other transactions using the electronic device based on the POI information displayed on the route map.

Steps 520-535 may be repeated as the movable selector is moved along the route. The user may indicate completion of POI selection, e.g. by selecting route calculation button on input display. At step 540, the POIs selected by the user may be further processed and the route may be re-calculated based on the user POI selections. At step 545, the re-calculated route map and directions may be displayed to the user based on the POI selection received.

EXAMPLE 1

A user accesses an electronic map from his/her electronic device and enters a start location as Denver, Colo. and end location as Omaha, Nebr. as well as the estimated dates of travel, Dec. 21, 2013 to Dec. 23, 2013. The electronic map calculates and displays a route from Denver, Colo. to Omaha, Nebr. along with an arrow icon movable along the route. As the user moves the movable selector along the route, POI icons within a 5-minute driving travel time of the location of the movable selector in the direction of the destination location are automatically displayed on the route map. The user then selects the cursor over a POI icon of a hotel, which displays the name and whether there are any rooms available for the travel dates inputted by the user. The map then displays options for booking a room at the hotel, which the user uses to book a hotel room. The user continues to move the arrow along the route and select gas stations and restaurants along the route that the user wishes to be added to the route. The user then clicks on an icon for calculating the route and the route is re-calculated based on the user's inputs and displayed to the user.

EXAMPLE 2

A user accesses an electronic map from his/her electronic device and enters a start location as Baltimore, Md., a first stop location as Wilmington, Del. and an end location as Philadelphia, Pa. In addition, the user inputs via the input portion, a preference to stop at coffee shops with free Wi-Fi access. The electronic map calculates and displays a route from Baltimore to Philadelphia along with an arrow icon movable along the route. As the user moves the movable selector along the route, POI icons of coffee shops with free Wi-Fi within a 0.5-mile radius of the nearest highway exit to the location of the movable selector are dynamically automatically displayed on the route map. The user selects three coffee shops along the route and clicks on an icon for calculating the route. The route is re-calculated based on the coffee shop selections by the user and is displayed.

Figure 6:
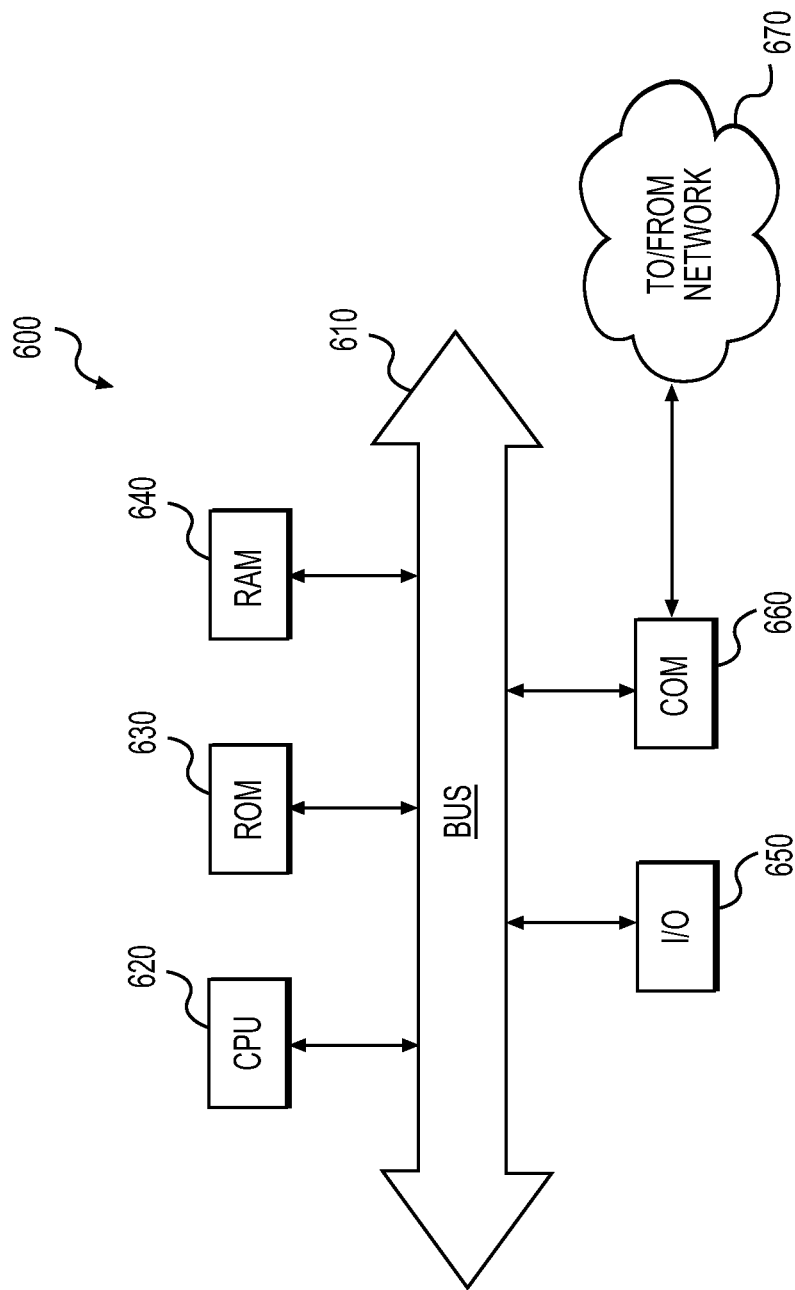
FIG. 6 is a simplified functional block diagram of a computer that may be configured as a host server, for example, to function as a mapping server.

FIG. 6 provides a functional block diagram illustration of general-purpose computer hardware platforms. FIG. 6 illustrates a network or host computer platform 600, as may typically be used to implement a server like the mapping server system 440. It is believed that those skilled in the art are familiar with the structure, programming, and general operation of such computer equipment and as a result, the drawings should be self-explanatory.

A platform for a server or the like 600, for example, may include a data communication interface for packet data communication 660. The platform may also include a central processing unit (CPU) 620, in the form of one or more processors, for executing program instructions. The platform typically includes an internal communication bus 610, program storage, and data storage for various data files to be processed and/or communicated by the platform such as ROM 630 and RAM 640, although the server 600 often receives programming and data via network communications 570. The hardware elements, operating systems, and programming languages of such equipment are conventional in nature, and it is presumed that those skilled in the art are adequately familiar therewith. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing to a user geographical mapping information relating to a trip from a start location to a destination location, the method including:
   receiving, from a user's electronic device and over a network, user input data including at least the destination location;
   generating and displaying a route from the start location to the destination location on an electronic map based on the user input data, the generated route having a movable icon movable by the user to any location on the generated route;
   receiving, from the user's electronic device, by the user dragging the movable icon along the generated route, an indicated location of the movable icon on the generated route;
   determining a selected location as a location of a highway exit located closest to the indicated location of the movable icon, the selected location being different from the indicated location;
   determining and displaying on the electronic map, one or more points of interest within a received range of the selected location of the movable icon along the generated route;
   receiving, from the user's electronic device, a selection by the user of at least one of the one or more points of interest;
   generating a modified route from the start location to the destination location which includes the selected at least one of the one or more points interest; and
   displaying, on the user's electronic device, the modified route with the selected at least one of the one or more points interest as one or more stops along the modified route,
   wherein the start location is determined based on the location of the user's electronic device.

2. The method of claim 1, further comprising, receiving, from the user's electronic device, by the user dragging an indicia of the range from the movable icon, a selection of a tolerable travel range from the generated route, wherein the step of determining points of interest is determined within the selected travel range from the generated route.

3. The method of claim 2 wherein the travel range is distance.

4. The method of claim 2 wherein the travel range is time.

5. The method of claim 1, wherein the steps between and including generating a route and generating a modified route are repeated each time the point is moved along the generated route by the user.

6. The method of claim 1 wherein the step of receiving, from a user's electronic device and over a network, user input data including at least the destination location, further comprises receiving at least one additional parameter.

7. The method of claim 6 wherein the at least one additional parameter comprises a type of points of interest.

8. The method of claim 1 wherein the step of determining and displaying one or more points of interest comprises accessing mapping data related to the generated route from at least one database.

9. The method of claim 1 wherein the movable icon is displayed as a sliding selector.

10. The method of claim 9 wherein the step of determining and displaying the one or more points of interest within the range of the selected location along the generated route on the electronic map is dynamically coupled to movement of the movable icon along the generated route.

11. The method of claim 1 further comprising completing an electronic transaction with an entity associated with at least one of the selected one or more points of interest.

12. The method of claim 1 wherein the step of determining and displaying one or more points of interest within a distance range of the movable icon along the generated route on the electronic map comprises determining and displaying route information relative to the start location.

13. The method of claim 1, wherein the step of determining and displaying the one or more points of interest further comprises continually updating the displayed points of interest on the electronic map corresponding to the movement of the movable icon.

14. The method of claim 1, wherein the step of determining and displaying the one or more points of interest further comprises displaying, in advance, points of interest to the user on the electronic map corresponding with the movement of the movable icon and based on a preset distance from the movable icon.

15. The method of claim 1, wherein the generating and displaying the generated route further comprises the generated route having a plurality of points, each point along the generated route associated with one of a plurality of points of interest, each of the plurality of points of interest associated with the movable icon as the movable icon moves along the plurality of points comprising the generated route.

16. A system for providing to a user geographical mapping information relating to a trip from a start location to a destination, the system including:
   one or more processors forming a central processing unit (CPU) complex configured to execute an operating system in the system, wherein the one or more processors each comprise hardware configured to execute instructions included in the operating system; and
   a data storage device storing instructions for causing one or more processors to provide to a user geographical mapping information relating to a trip from a start location to a destination; the one or more processors configured to execute the instructions to perform a method of:
   receiving, from a user's electronic device and over a network, user input data including at least the destination location;
   generating and displaying a route from the start location to the destination location on an electronic map based on the user input data, the generated route having a movable icon movable by the user to any location on the generated route;
   receiving, from the user's electronic device, by the user dragging the movable icon along the generated route, an indicated location of the movable icon on the generated route;
   determining a selected location as a location of a highway exit located closest to the indicated location of the movable icon, the selected location being different from the indicated location;

determining and displaying on the electronic map, the one or more points of interest within a received range of the selected location of the movable icon along the generated route;

receiving, from the user's electronic device, a selection by the user of at least one of the one or more points of interest;

generating a modified route from the start location to the destination location which includes the selected at least one of the one or more points interest; and displaying, on the user's electronic device, the modified route with the selected at least one of the one or more points interest as one or more stops along the modified route, wherein the start location is determined based on the location of the user's electronic device.

17. The system of claim 16, further comprising, receiving, from the user's electronic device, by the user dragging an indicia of the range from the movable icon, a selection of a tolerable travel range from the generated route, wherein the step of determining points of interest is determined within the selected travel range from the generated route.

18. The system of claim 16, wherein the steps of receiving, from the user's electronic device, a selection of a location along the generated route, determining and displaying one or more points of interest with a distance range of the selected location along the generated route on the electronic map, and receiving, from the user's electronic device, a selection of at least one of the one or more points of interest, are repeated prior to the step of generating the modified route based on the selection of the at least one of the one or more points of interest.

19. The system of claim 16 wherein the step of receiving, from a user's electronic device and over a network, user input data including at least the destination location further comprises receiving at one additional parameter.

20. The system of claim 16 wherein the selection of a location along the generated route is displayed as a sliding selector movable along the generated route.

21. A non-transitory computer-readable medium storing an information processing program that, when executed by a processor, causes the processor to provide geographical mapping information to a user relating to a trip from a start location to a destination, the method including:

receiving, from a user's electronic device and over a network, user input data including at least the destination location;

generating and displaying a route from the start location to the destination location on an electronic map based on the user input data, the generated route having a movable icon movable by the user to any location on the generated route;

receiving, from the user's electronic device, by the user dragging the movable icon along the generated route, an indicated location of the movable icon on the generated route;

determining a selected location as a location of a highway exit located closest to the indicated location of the movable icon, the selected location being different from the indicated location;

determining and displaying on the electronic map, one or more points of interest within a received range of the selected location of the movable icon along the generated route;

receiving, from the user's electronic device, a selection by the user of at least one of the one or more points of interest;

generating a modified route from the start location to the destination location which includes the selected at least one of the one or more points interest; and displaying, on the user's electronic device, the modified route with the selected at least one of the one or more points interest as one or more stops along the modified route, wherein the start location is determined based on the location of the user's electronic device.

\* \* \* \* \*